United States Patent
Brand et al.

(10) Patent No.: US 11,742,159 B2
(45) Date of Patent: Aug. 29, 2023

(54) SWITCH

(71) Applicant: Siemens Nederland N.V., The Hague (NL)

(72) Inventors: Bastiaan Brand, Hilversum (NL); Cezanne de Heus, Borculo (NL)

( * ) Notice: Subject to any disclaimer, the term of this patent is extended or adjusted under 35 U.S.C. 154(b) by 137 days.

(21) Appl. No.: 17/420,673

(22) PCT Filed: Jan. 10, 2020

(86) PCT No.: PCT/EP2020/050557
§ 371 (c)(1),
(2) Date: Jul. 4, 2021

(87) PCT Pub. No.: WO2020/144338
PCT Pub. Date: Jul. 16, 2020

(65) Prior Publication Data
US 2022/0102088 A1 Mar. 31, 2022

(30) Foreign Application Priority Data
Jan. 11, 2019 (EP) .................................... 19151398

(51) Int. Cl.
*H01H 11/00* (2006.01)
*H01H 9/16* (2006.01)
*H01H 71/04* (2006.01)

(52) U.S. Cl.
CPC ........ *H01H 11/0062* (2013.01); *H01H 9/167* (2013.01); *H01H 71/04* (2013.01); *H01H 2300/032* (2013.01)

(58) Field of Classification Search
CPC .. H01H 1/0015; H01H 9/167; H01H 11/0062; H01H 71/04; H01H 2071/006; H01H 2300/032; Y02B 90/20; Y04S 20/14
USPC ........................................................ 307/139
See application file for complete search history.

(56) References Cited

U.S. PATENT DOCUMENTS

| 5,604,437 A * | 2/1997 | Moncorge ............ H01H 1/0015 324/424 |
| 2013/0329331 A1* | 12/2013 | Erger ...................... H01H 9/168 361/102 |
| 2016/0327611 A1* | 11/2016 | Ware ...................... H01H 73/12 |

FOREIGN PATENT DOCUMENTS

| CA | 2113193 A1 | 11/1993 | |
| CN | 105823983 A | 8/2016 | |
| EP | 0665567 A1 | 8/1995 | |
| EP | 2884233 A2 * | 6/2015 | ............... G01K 7/16 |
| EP | 2884233 A2 | 6/2015 | |
| EP | 3091553 A1 | 11/2016 | |
| WO | 9323760 A1 | 11/1993 | |
| WO | WO-9323760 A1 * | 11/1993 | ......... G01R 31/3275 |

OTHER PUBLICATIONS

Machine translation of Schaar European Patent Document EP 2884233 A2 Jun. 17, 2015 (Year: 2015).*

(Continued)

*Primary Examiner* — Kevin J Comber
(74) *Attorney, Agent, or Firm* — Wolter Van Dyke Davis, PLLC

(57) ABSTRACT

A switch that includes a sensor device capable of transmitting data related to a sensor signal of at least one sensor of the sensor device to an external unit through wireless communication.

13 Claims, 2 Drawing Sheets

(56) References Cited

OTHER PUBLICATIONS

PCT International Search Report and Written Opinion of International Searching Authority dated Apr. 20, 2020 corresponding to PCT International Application No. PCT/EP2020/050557 filed Jan. 10, 2020.

* cited by examiner

SWITCH

CROSS REFERENCE TO RELATED APPLICATIONS

This application is the US National Stage of International Application No. PCT/EP2020/050557 filed 10 Jan. 2020, and claims the benefit thereof. The International Application claims the benefit of European Application No. EP19151398 filed 11 Jan. 2019. All of the applications are incorporated by reference herein in their entirety.

FIELD OF INVENTION

The invention relates to switches and systems comprising switches.

BACKGROUND OF THE INVENTION

Medium and high voltage switchgear is made to ensure the best possible relationship between reliability and optimum wear reserve over the expected operational lifetime (>25 year).

Components of the switchgear however are prone to suffer from aging effects and environmental effects (corrosion, humidity, insects). Aging, corrosion and wear of the individual components have a huge effect on the total reliability of the system.

A good example is the effect of corrosion in trip coils and the subsequent drive mechanism of the circuit breakers (hydraulic or spring operated). In these cases the circuit breaker might not even respond to a trip signal at all.

Circuit breakers need to act within a given bandwidth of operation time. Several milliseconds in delay (if a short circuit in a network is detected) may have a significant effect on the entire grid. Network operators mitigate this risk by periodically inspecting the "health" of the circuit breakers by performing diagnostic cycles. These diagnostic cycles may include measuring the reaction time of the circuit breakers, measuring the current through trip coils and measuring the speed curve (x,t) of the breaker mechanism.

The problem involved with these diagnostic cycles is that the technicians in charge rely on external measuring equipment. The external measuring equipment has to be attached to the circuit breaker and tested prior to the actual measurement. In consequence, the circuit breaker has performed several switching operations before the actual condition assessment takes place. These additional switching operations may influence the condition assessment since any switching delay due to corrosion in trip coils, mechanical stiffness of seals, hardening of lubrication etc. might be overcome (often referred to "circuit breaker gymnastics") during the testing of the measuring equipment prior to the actual condition assessment. The condition assessment may therefore be inaccurate and may give a false impression.

Therefore, the "first" switching operation should be measured to assess the actual reliability of the circuit breaker, in particular if the circuit breaker is used as a protection device in a medium and high voltage network.

Today, measurements with respect to the "first" switching operation are intrusive because they require access to the switchgear. For instance, breaker control panels need to be partially opened to mount the measuring device. Furthermore, in order to guarantee a safe work environment for field service personnel, energy in the network needs to be redirected.

SUMMARY OF INVENTION

In view of the above, the object of the present invention is to provide an optimized switch.

An embodiment of the present invention relates to a switch which comprises a sensor device capable of transmitting data related to a sensor signal of at least one sensor of the sensor device to an external unit through wireless communication.

A switch according to this embodiment allows gathering and transmitting of information without external measuring devices or the involvement of on-site specialists. Each switching activity may be recorded without "breaking into" the local infrastructure. Further, existing switches can be equipped with sensor devices without modifying the internal wiring inside the switch. The switch and the protection system based thereon may remain unaffected.

The switch is advantageously a high-voltage (>1 kV) switch, i.e. a switch that is capable of switching currents and/or separating electrical contacts in high-voltage grids. The switch advantageously comprises a circuit breaker unit providing an on-state where a current flow between contacts of the circuit breaker is possible, and an off-state where a current flow between the contacts is interrupted.

The switch advantageously comprises a trip coil configured to transfer the switch from the on-state to the off-state in response to a trip coil current. The at least one sensor or at least one of the sensors is advantageously a current sensor configured to sense the current through the trip coil.

The current sensor is advantageously inductively coupled to a conductor that conducts the trip coil current.

The switch may comprise an actuator that is accelerated when the switch is activated to get into its off-state. The at least one sensor or at least one of the sensors is advantageously a movement detector configured to measure the motion of the actuator.

The movement detector is advantageously mounted on the actuator or at least mechanically coupled with the actuator.

The movement detector is advantageously an acceleration sensor. Gyro sensors are considered to be optimal. The gyro sensors are advantageously 3-axis SMD sensors.

The sensor device advantageously comprises a control unit connected to the sensor or sensors.

The control unit may be configured to provide a sleep-mode where the sensor device does not communicate, and an active mode where the sensor device evaluates the sensor signals and communicates with the external unit via wireless communication. The sleep-mode may significantly decrease the power consumption of the control unit.

According to an embodiment, the switch comprises a trip coil configured to activate the off-state of the switch in response to a trip coil current applied to the trip coil. The control unit is advantageously configured to activate its active mode upon occurrence of the trip coil current.

For instance, energy provided by the trip coil current may wake the control unit up and activate the active mode of the control unit. The control unit is advantageously battery-powered and configured to enter its active mode in response to a sensor signal that indicates the occurrence of the trip coil current. A battery-based power supply minimizes the adaptations needed to accommodate the control unit and sensors inside the switch.

The control unit is advantageously configured to analyze the sensor signal or sensor signals, identify relevant signal sections, and based thereon generate said data that are transmitted to the external unit. In other words, only relevant signal sections are advantageously transmitted.

For energy-efficient transmission, the sensor device advantageously comprises a communication unit capable of communicating with Long-Range-Low-Power communication networks. Alternatively or additionally, the communication unit may be capable of communicating according to WIFI, Bluetooth or other mobile communication standards.

A further embodiment of the invention relates to a system comprising a switch and an external unit. The switch is advantageously a switch as described above. The external unit is advantageously formed by a cloud application provided by a remote computer or computer system.

The external unit may be configured to evaluate the data from the switch and generate an evaluation result indicating the health status or rate of wear of the switch.

BRIEF DESCRIPTION OF THE DRAWINGS

In order that the manner in which the above-recited and other advantages of the invention are obtained will be readily understood, a more particular description of the invention briefly described above will be rendered by reference to specific embodiments thereof which are illustrated in the appended drawings. Understanding that these drawings depict only typical embodiments of the invention and are therefore not to be considered to be limiting of its scope, the invention will be described and explained with additional specificity and detail by the use of the accompanying drawings in which.

DETAILED DESCRIPTION OF THE EMBODIMENTS

These embodiments of the present invention will be best understood by reference to the drawings. It will be readily understood that the present invention, as generally described and illustrated in the figures herein, could vary in a wide range. Thus, the following more detailed description of the exemplary embodiments of the present invention, as represented in the figures, is not intended to limit the scope of the invention, as claimed, but is merely representative of presently advantageous embodiments of the invention.

Figure 1:
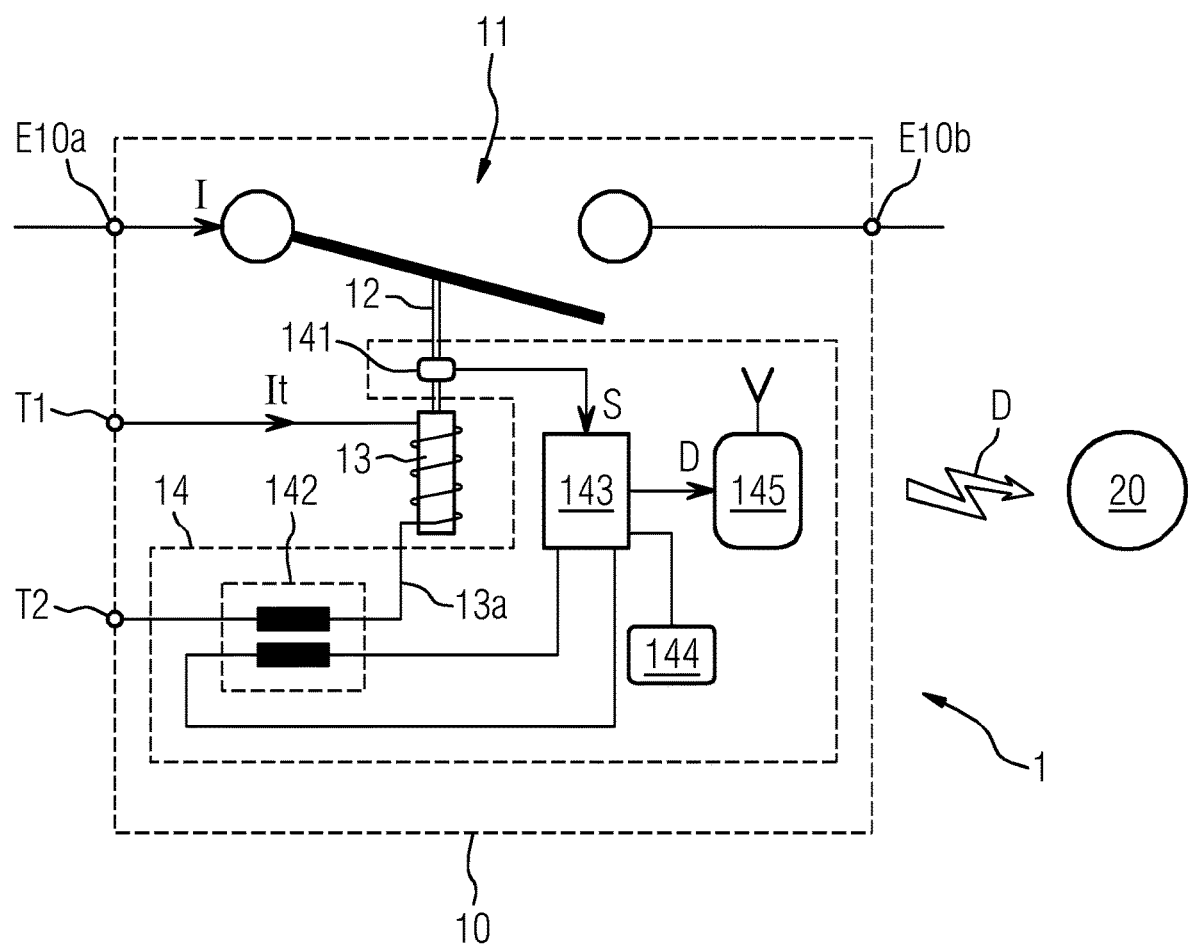
FIG. 1 illustrates an exemplary embodiment of a switch according to the present invention.
Figure 2:
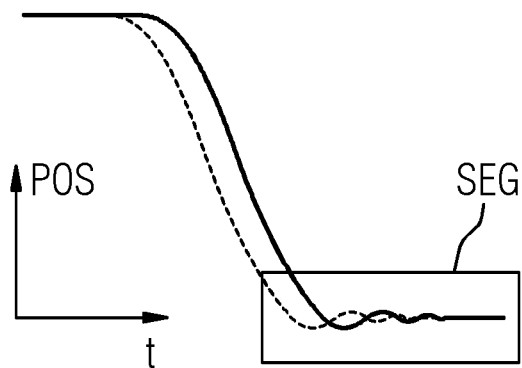
FIG. 2-5 illustrate exemplary measurement data related to the switch of FIG. 1.
Figure 3:
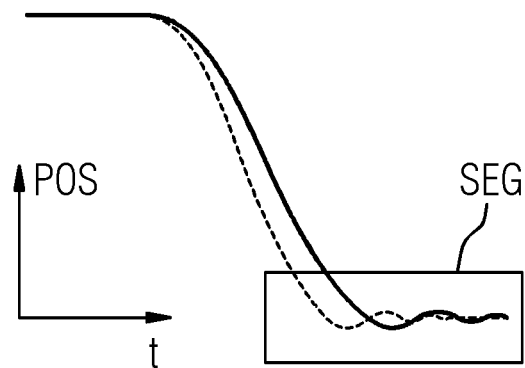
Figure 4:
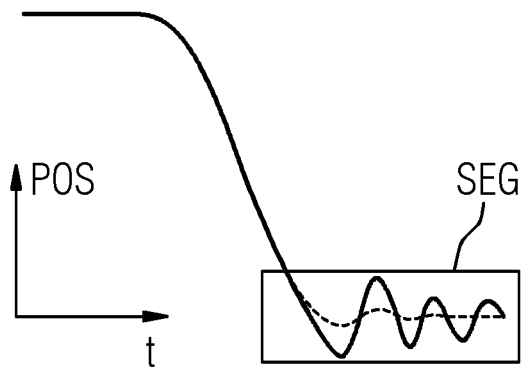
Figure 5:
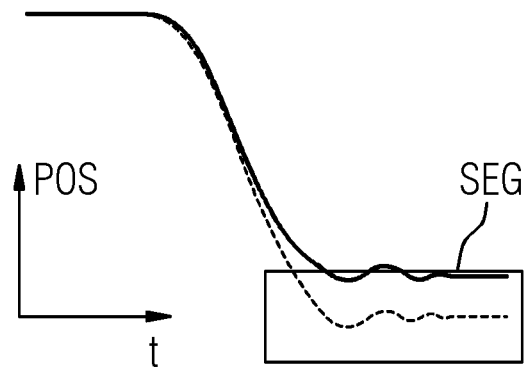

FIG. 1 shows an exemplary embodiment of a system 1 and a switch 10 according to the present invention. The switch 10 is a high-voltage (>1 kV) switch and comprises a circuit breaker unit 11. The circuit breaker unit 11 provides an on-state where a current I may flow between contacts E10a and E10b. In an off-state (as shown in FIG. 1), a current flow between the contacts E10a and E10b is interrupted.

In order to switch the circuit breaker unit 11 from the on-state into the off-state, the switch 10 comprises an actuator 12 and a trip coil 13. In response to a trip coil current It, the actuator 12 is transferred into the position shown in FIG. 1 and the switch is switched off.

The switch 10 further comprises a sensor device 14. The sensor device 14 comprises an acceleration sensor 141, a current sensor 142, a control unit 143, a battery 144 and a communication unit 145.

The acceleration sensor 141 is mounted on the actuator 12 and capable of measuring the acceleration of the actuator 12. By integrating the acceleration values over time, the control unit 143 may determine the velocity and/or location of the actuator 12 during the actuator's movement from the on-state into the off-state. The acceleration sensor 141 is advantageously a 3-axis SMD (surface mounted device) gyro sensor.

The current sensor 142 is advantageously inductively coupled to a conductor 13a that conducts the trip coil current It. The trip coil current It may be injected at trigger ports T1 and T2 of the switch 10. The communication unit 145 is advantageously a wireless device according to any mobile communication standard (e.g. WIFI, Bluetooth, Long-Range-Low-Power communication, etc).

The sensor device 14 and its control unit 143 may operate as follows:

As long as the switch 10 is in its on-state and no trip coil current is present, the control unit 143 advantageously operates in a sleep-mode where the communication unit 145 does not communicate. In the sleep-mode, the power consumption is minimal in order to maintain the battery's charge.

As soon as the current sensor 142 senses a trip coil current the control unit 143 wakes up and activates its active mode. In the active mode, the control unit 143 receives a sensor signal S from the acceleration sensor 141 and transmits data D wirelessly to an external unit 20 via the communication unit 145. The external unit 20 may be formed by a cloud application provided by a remote computer or computer system.

In order to reduce the amount of data D that have to be transmitted, the control unit 143 advantageously analyzes the sensor signal S of the acceleration sensor 141 and identifies relevant signal sections SEG (see FIGS. 2-5). Data related to the relevant signal sections SEG are then transmitted via the communication unit 145.

FIGS. 2 to 5 show graphs visualizing the position POS of the actuator 12 over time t during the transition from the on-state to the off-state of the circuit breaker unit 11. The position POS may have been calculated based on the sensor signal S of the acceleration sensor 141.

The graphs depict different aging or "health" states of the circuit breaker unit 11. It is apparent that the final signal section SEG of each graph is the most relevant. Therefore, the control unit 143 advantageously extracts the final signal sections SEG and transmits only data that are related to these signal sections SEG, to the external unit 20.

Additionally or alternatively, the control unit 143 may analyze the trip coil current It, identify relevant signal sections thereof, and transmit data related thereto to the external unit 20.

Upon receipt of the data D, the external unit 20 may analyze the signal sections SEG and generate a warning signal if the received data show or suggest a malfunction or the need for maintenance or replacement.

In the exemplary embodiment described above, all switching activities may be recorded by non-intrusive measuring. By using IoT (Internet of Things; for example Long Range Low Power) communication networks, the data D may be gathered without using other local infrastructure.

For instance, an array of (e.g. small SMD) sensors may permanently be mounted to the circuit breaker unit 11, measure circuit breaker data when operated and send the measured data, with the help of "Internet of Things" supported networks, to a Cloud.

Further embodiments may (but do not need to) include one or more of the following features:

Trip coil current: An inductive loop may be located around the primary trip coil connection (without disconnection of wires) in order to measure the trip coil curve.

Switch times/velocity: A (miniature) 3-axis SMD gyro sensor may be mounted to an actuator.

Registration of acceleration over time (calculation of speed and travel possible): The gathered data may be stored locally on a miniature circuit board and transmitted via (but not limited to) Long Range Low Power communication. Since such circuit boards require a very low amount of energy, for sensing and transmitting, the device may be battery operated.

The sensor device may be non-intrusive and does not require an external power supply. Data do not need to be routed via existing (private) operation networks.

The sensor device, that is advantageously implemented in a circuit board, and the sensors may be fully operational within 2 milliseconds after activation (for example by the trip coil current as input trigger).

Roughly all data may be collected and an expected operational life on one battery can be in excess of 10 years.

On sensor level, no excessive computing power is required. The data may be available "in the cloud", thus opening new software driven service potential.

All breaker commands may be monitored: Hence data from the first (and most important) breaker operation may be available. Since this may be done with equipment that is not connected directly to the secondary wiring and since sensing may be done on miniature scale, the implementation can be very simple.

By use of new IoT enabled networks data may be easily transmitted and analyzed centrally. Since all data is available centralized cross reference analytics can be made based on asset type, age, drive, environmental data etc.

Because the sensor device may be installed onto high-voltage or middle-voltage installation and may stay there, the sensor device has the capability of measuring the trip coil current whenever the breaker is operated.

The sensor device may be in hibernating state. A trip coil current may actuate the circuit board, thus limiting the battery draw.

IoT networks require very low data transmission power thus reducing the battery storage capacity (and reducing the device footprint).

Sensing of switching time (travel of the breaker actuator) may be registered by use of SMD Gyro sensors. This will give insight in any deviations or abnormality.

The use of conventional analogue or digital transducers may not be necessary anymore.

An IoT enabled sensor device may provide a contribution to a "digital enabled service" strategy.

The sensor device allows insights into deviations regarding the assumed circuit breaker health.

The sensor device may actively inform users that deviations in circuit breaker timing are occurring.

Since Gyro sensors and trip coil graphs may consume a lot of data, small local (circuit board mounted) processing may be advantageous. In order to transfer data local algorithms may determine what data is relevant to transmit. Within these squares a micro grid may be superimposed. Then, X and Y data of the affected grid (particle) may only be transmitted. With this approach small data packages may be transmitted and the further evaluation is carried out "in the cloud".

The various embodiments and aspects of embodiments of the invention disclosed herein are to be understood not only in the order and context specifically described in this specification, but to include any order and any combination thereof. Whenever the context requires, all words used in the singular number shall be deemed to include the plural and vice versa. Whenever the context requires, all options that are listed with the word "and" shall be deemed to include the world "or" and vice versa, and any combination thereof.

In connection with the drawings and specification, there have been disclosed a plurality of embodiments of the present invention. The applicant would like to emphasize that each feature of each embodiment may be combined with or added to any other of the embodiments in order to modify the respective embodiment and create additional embodiments. These additional embodiments form a part of the present disclosure and, therefore, the applicant may file further patent claims regarding these additional embodiments at a later stage of the prosecution.

The invention claimed is:

1. A switch, comprising:
   a sensor device capable of transmitting data related to a sensor signal of at least one sensor of the sensor device to an external unit through wireless communication; and
   wherein the sensor device comprises a control unit connected to the sensor or sensors;
   wherein the control unit is configured to provide a sleep-mode where the sensor device does not communicate, and an active mode where the sensor device evaluates the sensor signals and communicates with the external unit via wireless communication;
   wherein the switch comprises a trip coil configured to activate an off-state of the switch in response to a trip coil current applied to the trip coil; and
   wherein the control unit is configured to activate its active mode upon occurrence of the trip coil current.

2. The switch of claim 1, further comprising:
   a circuit breaker unit providing an on-state where a current flow between contacts of the circuit breaker unit is possible, and an off-state where a current flow between the contacts is interrupted.

3. The switch according to claim 1,
   wherein the trip coil is configured to transfer the switch from an on-state to the off-state in response to the trip coil current, wherein the at least one sensor or at least one of the sensors is a current sensor configured to sense a current through the trip coil.

4. The switch of claim 3,
   wherein the current sensor is inductively coupled to a conductor that conducts the trip coil current.

5. The switch according to claim 1, further comprising:
   an actuator that is accelerated when the switch is activated to adopt its off-state,
   wherein the at least one sensor or at least one of the sensors is a movement detector configured to measure a motion of the actuator.

6. The switch according to claim 5,
   wherein the movement detector is mounted on the actuator or at least mechanically coupled with the actuator.

7. The switch according to claim 5,
   wherein the movement detector is an acceleration sensor.

8. The switch according to claim 7,
   wherein the acceleration sensor comprises a gyro sensor.

9. The switch according to claim 1,
   wherein energy provided by the trip coil current wakes the control unit up and activates the active mode of the control unit, and/or wherein the control unit is battery-powered and configured to enter its active mode in response to a sensor signal that indicates the occurrence of the trip coil current.

10. The switch according to claim 1,
wherein the control unit is configured to analyze the sensor signal or sensor signals, identify relevant signal sections, and based thereon generate said data that are transmitted to the external unit.

11. The switch according to claim 1,
wherein the sensor device comprises a communication unit capable of communicating with WIFI-, Bluetooth- and/or Long-Range-Low-Power-communication networks.

12. A system, comprising:
a switch according to claim 1, and
an external unit,
wherein the external unit is formed by a cloud application provided by a remote computer or computer system.

13. The system of claim 12,
wherein the external unit is configured to evaluate data from the switch and generate an evaluation result indicating a health status or rate of wear of the switch.

\* \* \* \* \*